Feb. 14, 1939.                S. SCHNELL                2,146,855
                         FLUID BRAKING APPARATUS
                          Filed Oct. 30, 1936
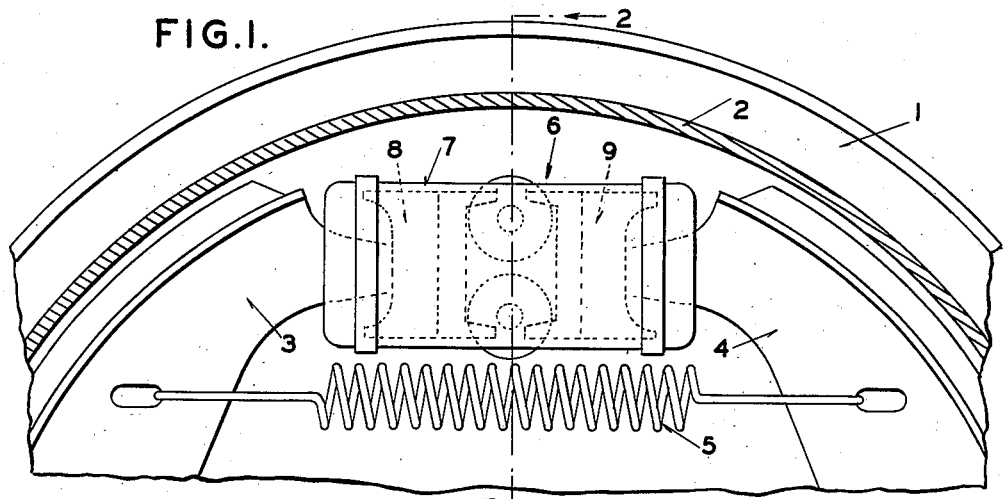
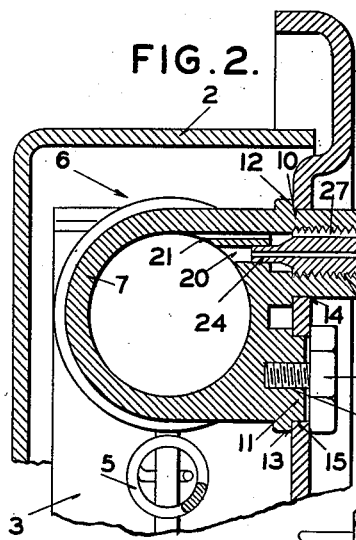
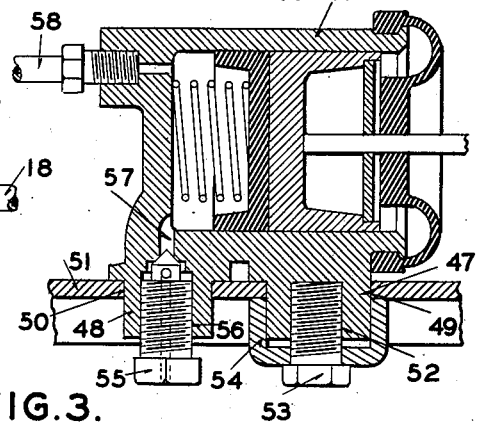
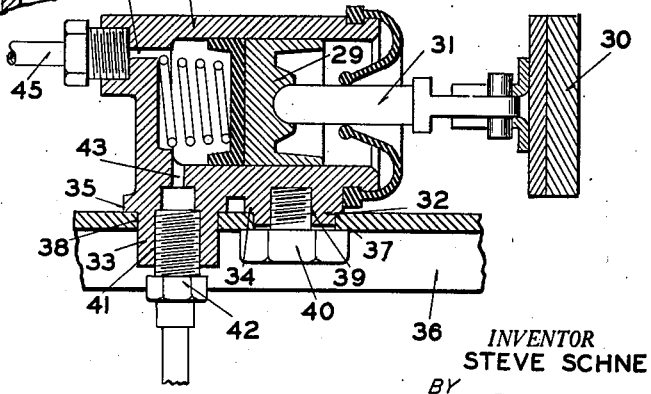
INVENTOR
STEVE SCHNELL
BY
ATTORNEY Patented Feb. 14, 1939

2,146,855

UNITED STATES PATENT OFFICE 2,146,855

FLUID BRAKING APPARATUS

Steve Schnell, St. Louis, Mo., assignor to Wagner Electric Corporation, St. Louis, Mo., a corporation of Delaware Application October 30, 1936, Serial No. 108,325

3 Claims. (Cl. 188—152)

My invention relates to fluid-operated braking apparatus and one of the objects is to provide improved means for rigidly mounting a brake operating fluid motor on its supporting element.

Another object of my invention is to so construct a fluid motor for a brake that it may be rigidly attached to the brake shoe supporting element by a single clamping member and in such a manner that any force tending to move the motor in the plane of the support will be transmitted directly to the supporting element and not through the clamping member.

A more specific object of my invention is to provide the cylinder of a fluid brake actuating motor with two integral lugs for reception in two openings in a support whereby the cylinder may be rigidly attached to the support by a single clamping bolt cooperating with one of the lugs and the other lug may be provided with a passageway for either bleeding the cylinder or connecting the cylinder to a fluid conducting conduit.

Other objects of my invention will become apparent from the following description taken in connection with the accompanying drawing in which Figure 1 is a view of a portion of a fluid-actuated brake showing a double piston fluid motor attached to the backing plate in accordance with my invention; Figure 2 is a cross-sectional view on the line 2—2 of Figure 1; Figure 3 is a cross-sectional view of a single piston fluid motor and associated brake end showing the motor secured to the backing plate in accordance with my invention; and Figure 4 is a cross-sectional view similar to Figure 3, showing a slightly modified construction.

Referring in detail to Figures 1 and 2, numeral 1 indicates a supporting or backing plate which is secured to some fixed part of the vehicle in a well known manner and this plate is adapted to close the open side of a brake drum 2 which is secured to the wheel of the vehicle. A pair of brake shoes 3 and 4 are mounted upon the supporting plate for cooperation with the drum to retard the rotation thereof, these shoes being held in retracted position by a suitable spring 5, the retracted position being determined by suitable stops not shown. The ends of the brake shoes 3 and 4 are adapted to be expanded by the fluid motor 6 which comprises a cylinder 7 having reciprocable therein a pair of pistons 8 and 9, piston 8 cooperating with shoe 3 and piston 9 cooperating with shoe 4 in a well known manner.

In accordance with my invention, I provide improved means for attaching the fluid motor to the backing plate 1, this construction being such as to require only a single clamping member and also being such that any forces tending to move the cylinder in the plane of the backing plate will be transmitted directly from the cylinder to the backing plate itself and not by or through the clamping member. The central part of the cylinder is formed with two integral bosses or lugs 10 and 11 vertically spaced apart, lug 10 having formed thereon a shoulder 12 and lug 11 having formed thereon a shoulder 13. The portion of lug 10 beyond shoulder 12 is of such size as to be snugly received in a cooperating opening 14 in the backing plate and of such length as to extend a short distance beyond the outer surface of the backing plate. The portion of lug 11 beyond shoulder 13 is also of such size as to be snugly received in opening 15 in the backing plate but the length of this portion of the lug is slightly less than the thickness of the backing plate as shown in Figure 2. The lug 11 is formed with a screw-threaded hole 16 and cooperating therewith is a stud bolt 17 having a head thereon of greater width than that of opening 15 in the backing plate. When lugs 10 and 11 are inserted in their respective openings in the backing plate and stud 17 screwed into the threaded hole of lug 11 and turned home, cylinder 7 will be rigidly clamped to the backing plate at shoulder 13. It is thus seen that this single bolt is all that is necessary to hold the fluid motor in position. It is impossible for the fluid motor to turn on the backing plate as any turning force is prevented by lug 10 which is received in opening 14 of the backing plate. Due to the snug fit between lugs 10 and 11 and their cooperating openings, any turning force on the fluid motor will be taken directly from the cylinder by the backing plate.

The lug 10, in addition to serving as a means for directly transmitting any turning force on the fluid motor to the backing plate, is also employed as a convenient means for attaching a fluid supply conduit to the cylinder. The specific type of fitting construction between the fluid supply conduit 18 and the cylinder is shown as also employing a bleeder valve but it is understood that other types of fittings may be employed if desired. The lug 10 is formed with a threaded bore 19 which is in communication with the interior of cylinder 7 by an axially aligned passage 20 and also a parallel passage 21. The fitting element 22 is formed with a central passage 23 and this fitting element has a screw-threaded portion which cooperates with the threaded bore 19 and a nose portion 24 which fits into passage 20 to thereby place passage 23 of the fitting in direct communication with passage 20 in the cylinder wall. The fitting 22 is also adapted to clamp the bleeder valve construction 25 between it and the end of lug 10, the bleeder valve passage 26 being in communication with passage 21 in the cylinder by means of a suitable groove 27 in the surface of the fitting member 22. The supply conduit 18 may be a copper tube as shown and suitably attached by the usual threaded nut to the outer end of fitting 22 so that it is directly in communication with passage 23 of the fitting.

Referring to Figure 3, I have shown a single piston fluid motor secured to a backing plate in accordance with my invention. The motor comprises a cylinder 28 having reciprocable therein a single piston 29 connected in a well known manner to the end of the brake shoe 30 by means of a push rod 31. The cylinder wall has formed integral therewith lugs 32 and 33, lug 32 having a shoulder 34 and lug 33 having a shoulder 35. The backing plate 36 is formed with an opening 37 for receiving lug 32 and with a second opening 38 for receiving lug 33. The lug 32, which does not extend entirely through its opening, is provided with a threaded hole 39 for receiving the clamping stud bolt 40 whereby the wheel cylinder may be clamped to the backing plate in a manner already described with respect to the construction shown in Figures 1 and 2.

The lug 33 is also provided with a threaded bore 41 which receives the threaded end of the fluid conducting conduit 42 whereby fluid may be supplied to the cylinder to actuate the piston by way of a passage 43 in the cylinder wall. Where two or more single piston motors are employed in a particular type of brake, cylinder 28 may be provided with a passageway 44 for connection with a tube 45 in the manner indicated.

In the construction shown in Figure 3 it is readily apparent that the wheel cylinder is rigidly secured to the backing plate and the construction is such that any force tending to turn the fluid motor on the backing plate will be transmitted directly from the cylinder to the backing plate in the manner already described. The single clamping bolt construction is sufficient to produce enough clamping effect to secure the fluid motor to the backing plate.

Referring to Figure 4, I have shown a single piston fluid motor attached to the backing plate by a slightly modified construction. The fluid motor itself is substantially the same as that shown in Figure 3 and the cylinder 46 thereof is provided with a pair of lugs 47 and 48 for cooperation with the openings 49 and 50 in the backing plate 51. The lug 47, which is provided with the clamping bolt, extends through and beyond its cooperating opening in the backing plate and is formed with a threaded hole 52. The head of the clamping bolt 53, instead of directly engaging the backing plate as in the construction previously described, is adapted to engage a cap member 54 telescoped upon the projecting end of lug 47. The walls of this cap are slightly greater in length than the portion of the lug which extends through the backing plate, thus providing a sufficient clearance between the end of the lug and the base of the cap, whereby the stud bolt may properly clamp the cylinder to the backing plate.

The lug 48, instead of having a conduit attached thereto, is provided with a bleeder screw 55 threaded into the threaded bore 56 of the lug, which lug is in communication with the interior of the cylinder by means of the passage 57. Fluid is supplied to the fluid motor by means of the conduit 58 attached to the end of the cylinder as shown.

From the above described embodiments of my invention it is apparent that I have devised a very simple and efficient means for mounting a fluid motor on a supporting plate of a brake which requires only a single clamping member, such being, in the present instance, a stud bolt. It is also apparent that the construction is such that any force tending to turn the fluid motor upon the support is transmitted directly from the cylinder to the supporting plate and not through the clamping member. The second integral lug which is employed to prevent the turning of the fluid motor also serves the purpose of providing a convenient connecting means for either a fluid conducting conduit or a bleeder passage as the case may demand.

Having fully described my invention, what I claim as new and desire to secure by Letters Patent of the United States is:

1. In fluid braking apparatus, a supporting plate provided with two spaced openings, a rotatable drum, a brake shoe for cooperation with the drum, a fluid motor for actuating the brake shoe and comprising a fluid receiving cylinder, said cylinder being provided with two integral projections of such size as to snugly fit in the two openings in the supporting plate, one of said projections being provided with a threaded hole extending into said projection but not communicating with the cylinder, means including a stud bolt having its threaded portion cooperating with the threaded hole and its head portion operatively associated with the plate for clamping the cylinder to the plate, and said other projection being provided with a threaded hole communicating with the interior of the cylinder and adapted to receive a threaded member having a passage therethrough.

2. In fluid braking apparatus, a supporting plate provided with two spaced openings, a rotatable drum, a brake shoe for cooperation with the drum, a fluid motor for actuating the brake shoe and comprising a fluid receiving cylinder, a fluid supply conduit secured to the cylinder and communicating with the interior of the cylinder, said cylinder being provided with two integral projections of such size as to snugly fit in the two openings in the supporting plate, one of said projections extending only partially through its opening and being provided with a threaded hole, means comprising a stud bolt cooperating with the threaded hole for clamping the cylinder to the plate, said other projection being provided with a threaded passage communicating with the interior of the cylinder, and a threaded bleeder plug for controlling said passage.

3. In fluid braking apparatus, a supporting plate provided with two spaced openings, a rotatable drum, a brake shoe for cooperation with the drum, a fluid motor for actuating the brake shoe and comprising a cylinder, said cylinder being provided with two integral projections of such size as to snugly fit in the two openings in the supporting plate, one of said projections extending through and beyond its opening and being provided with a threaded hole, a cap overlying said projection and having its bottom spaced from the end of said projection, and a stud bolt cooperating with the threaded hole in the projection for forcing the cap against the plate and clamping the cylinder to the plate.

STEVE SCHNELL.